United States Patent
Song et al.

(10) Patent No.: US 7,171,390 B1
(45) Date of Patent: Jan. 30, 2007

(54) SYSTEM AND METHOD FOR EXECUTING A RENTAL SOFTWARE PROGRAM IN DISTRIBUTED COMPUTING ENVIRONMENT

(75) Inventors: Dong-Ho Song, Seoul (KR); Jai-Wan Ahn, Seoul (KR)

(73) Assignee: Soft-On-Net, Inc., San Jose, CA (US)

( * ) Notice: Subject to any disclaimer, the term of this patent is extended or adjusted under 35 U.S.C. 154(b) by 0 days.

(21) Appl. No.: 09/641,535

(22) Filed: Aug. 18, 2000

(30) Foreign Application Priority Data

Dec. 31, 1999 (KR) .................. 10-1999-0068380

(51) Int. Cl.
 *G06F 99/00* (2006.01)
(52) U.S. Cl. .............. 705/52; 705/51; 713/167; 713/176; 709/22; 717/176
(58) Field of Classification Search .......... 705/1, 705/52, 51; 713/167
 See application file for complete search history.

(56) References Cited

U.S. PATENT DOCUMENTS

| | | | |
|---|---|---|---|
| 5,613,089 A | 3/1997 | Hornbuckle | |
| 5,767,850 A | 6/1998 | Ramanathan et al. | |
| 5,923,885 A | 7/1999 | Johnson et al. | |
| 5,925,127 A * | 7/1999 | Ahmad | 713/200 |
| 5,926,635 A | 7/1999 | Hsueh et al. | |
| 5,953,005 A * | 9/1999 | Liu | 345/302 |
| 6,026,437 A | 2/2000 | Muschett et al. | |
| 6,327,579 B1 * | 12/2001 | Crawford | 705/400 |
| 6,334,118 B1 * | 12/2001 | Benson | 705/52 |
| 2003/0040962 A1 * | 2/2003 | Lewis | 705/14 |
| 2005/0198239 A1 * | 9/2005 | Hughes | 709/222 |

FOREIGN PATENT DOCUMENTS

| | | |
|---|---|---|
| EP | 0 817 031 A2 | 1/1998 |
| EP | 0 841 616 A2 | 5/1998 |
| EP | 0 753 811 | 10/2002 |

(Continued)

OTHER PUBLICATIONS

WO 99/04357 published on Jan. 28, 1999.

(Continued)

*Primary Examiner*—Firmin Backer
(74) *Attorney, Agent, or Firm*—DLA Piper US LLP

(57) ABSTRACT

A system and method for executing a rental software program in a distributed computing environment is provided. The system enables the streaming of software applications to the client computer. It also enables the system calls of the software application to be intercepted and analyzed in order to determine when one or more optional files are needed. The system also suspends the operation of the software application during retrieval of the optional files from the server so that the software application does not crash and then restarts the software application once the optional files are retrieved. The system also protects the software application and its optional files from unwanted copying in that the system may remove all of the files from the client computer once the rental of the software application has been completed. Finally, the system also enables a software vendor to easily and quickly upload a new software application to the server so that client computers may rent the software application.

41 Claims, 10 Drawing Sheets

FOREIGN PATENT DOCUMENTS

KR    1998-065416    10/1998

OTHER PUBLICATIONS

PCT International Search Report dated Mar. 24, 2000 corresponding to PCT/KR00/00076.

PCT Written Opinion dated Feb. 21, 2001 corresponding to PCT/KR00/00076.

PCT International Preliminary Examination Report dated May 15, 2001 corresponding to PCT/KR00/00076.

WO 00 46685 published on Aug. 10, 2000.

* cited by examiner

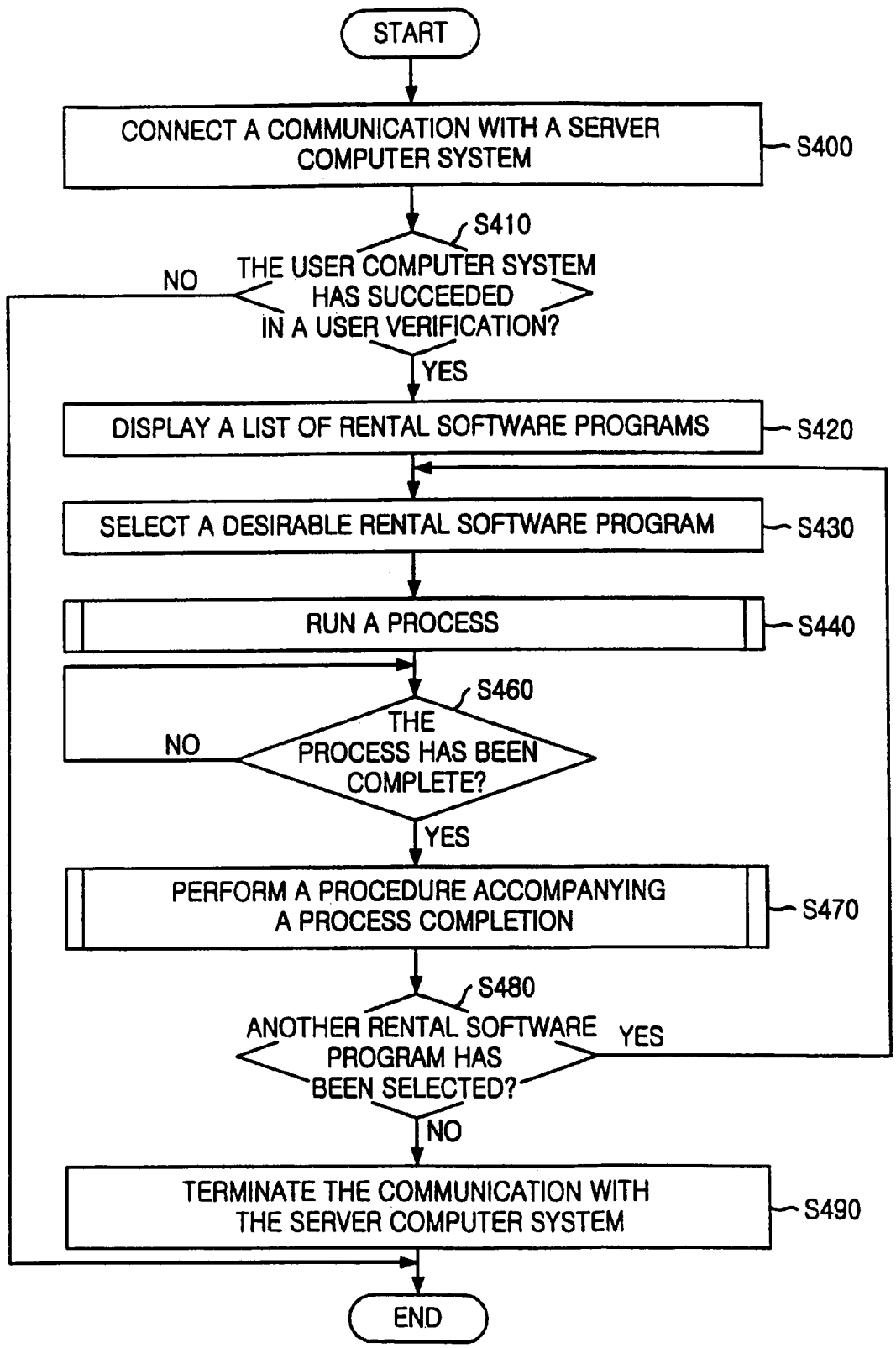

SYSTEM AND METHOD FOR EXECUTING A RENTAL SOFTWARE PROGRAM IN DISTRIBUTED COMPUTING ENVIRONMENT

TECHNICAL FIELD

The present invention relates to a system and method for executing a rental software program in a distributed computing environment; and, more particularly, to a system and method for executing a rental software program in a distributed computing environment, which includes a user computer system and a server computer system, wherein the user computer system optionally requests one or more optional files associated with the rental software program from the server computer system and the server computer system provides the one or more optional files requested to the user computer system.

BACKGROUND ART

Generally, using a conventional user computer system, the user installs a software program in a storage device. The conventional user computer system reads the primitive codes of the software program from a CD-ROM, a diskette or a server computer system. The primitive codes of the software program are stored in a system directory, e.g., a Microsoft Windows™ directory in a Microsoft Windows™ system provided by Microsoft Corporation, and a user directory. The system directory and the user directory have path information associated with the software program files. For example, the software program files may be made up of a main executable file, auxiliary executable files, registry files and other files, including *.dll and *.hlp files, in a Windows™ operating system.

The conventional user computer system needs a large storage space to store the desirable software programs in the storage device. In the case where the conventional user computer system employs various software programs, the conventional user computer system should install the various software programs. Also, in case where the desirable software program is upgraded or updated, the upgraded or updated software program should be installed in the conventional user computer system.

Typically, the conventional user computer system copies or downloads software program files from the server computer system as a remote computer system in order to execute a software program. At execution time, the conventional user computer system may need a specific software program file in addition to the copied or downloaded software program files. If the conventional user computer system does not have the specific program file, the conventional user computer system can not execute the software program.

SUMMARY OF INVENTION

A system for executing a rental software program in a distributed computing environment is provided that is capable of reducing both the storage space required for the software program in a user computer system and the start-up time of the program in the user computer system. The system employs program files associated with the rental software program that are provided by a server computer system that include an on-demand scheme and a user-transparent program install-free technology.

A method for executing a rental software program in a distributed computing environment is provided that is capable of reducing both the storage space required for the software program in the user computer system and the start-up time of the program in the user computer system. The method downloads program files associated with the rental software program from a server computer system, has an on-demand scheme and has a user transparent program install-free technology.

A computer-readable medium for executing a rental software program in a distributed computing environment is provided that is capable of reducing both the storage space of the software program in a user computer system and the start-up time of the program, which employs program files associated with the rental software program provided by a server computer system, with an on-demand scheme and a user-transparent program install-free technology.

In accordance with one aspect of the present invention, there is provided a system for executing a rental software program in a distributed computing environment, wherein the rental software program includes a main executable file and optional files. The system comprises a user computer system based on a user-transparent program install-free technology for selecting a desirable rental software program in a list of rental software programs to download the main executable file contained in the desirable rental software program and optionally requesting one or more optional files contained in the desirable rental software program; and a server computer system for providing the list of rental software programs. The main executable file of the desirable rental software program selected by said user computer system and the one or more optional files optionally requested from said user computer system are downloaded when a communication connection between said server computer system and said user computer system is established.

In accordance with an embodiment of another aspect of the present invention, there is provided a method for executing a rental software program in a distributed computing environment, wherein the rental software program includes a main executable file and optional files, comprising the steps of: a) establishing a communication connection between a user computer system and a server computer system, wherein the user computer system is based on a user-transparent program install-free technology; b) displaying a list of rental software programs, the list being downloaded from the server computer system; c) selecting a desirable rental software program in the list of rental software programs; d) downloading a main executable file associated with the desirable rental software program from the server computer system to run a process corresponding to the main executable file; and e) if the process needs one or more optional files, downloading the one or more optional files from the server computer system.

In accordance with another embodiment of another aspect of the present invention, there is provided a method for servicing an install-free application in an online software rental system, comprising the steps of: a) getting a list of applications available for a rental service from a server computer system; b) establishing a rental session between a client computer system and the server computer system; c) fetching one or more software applications from a plurality of software applications stored in the server computer system; d) executing the one or more software applications in the client computer system; and e) if the prior step is completed, flushing/deleting the one or more rented software application from the client computer system.

In accordance with another aspect of the present invention, there is provided a computer-readable medium for executing a rental software program in a distributed computing environment, wherein the rental software program includes a main executable file and optional files, comprising the steps of: a) establishing a communication connection between a user computer system and a server computer system, wherein the user computer system is based on a user-transparent program install-free technology; b) displaying a list of rental software programs, the list being downloaded from the server computer system; c) selecting a desirable rental software program in the list of rental software programs; d) downloading a main executable file associated with the desirable rental software program from the server computer system to run a process corresponding to the main executable file; and e) if the process needs one or more optional files, downloading the one or more optional files from the server computer system.

BRIEF DESCRIPTION OF DRAWINGS

The above and other objects and features of the instant invention will become apparent from the following description of preferred embodiments taken in conjunction with the accompanying drawings, in which:

FIG. 4 is a flowchart showing a method for executing a rental software program in a distributed computing environment in accordance with the present invention;

BEST MODE FOR CARRYING OUT THE INVENTION

Figure 1:
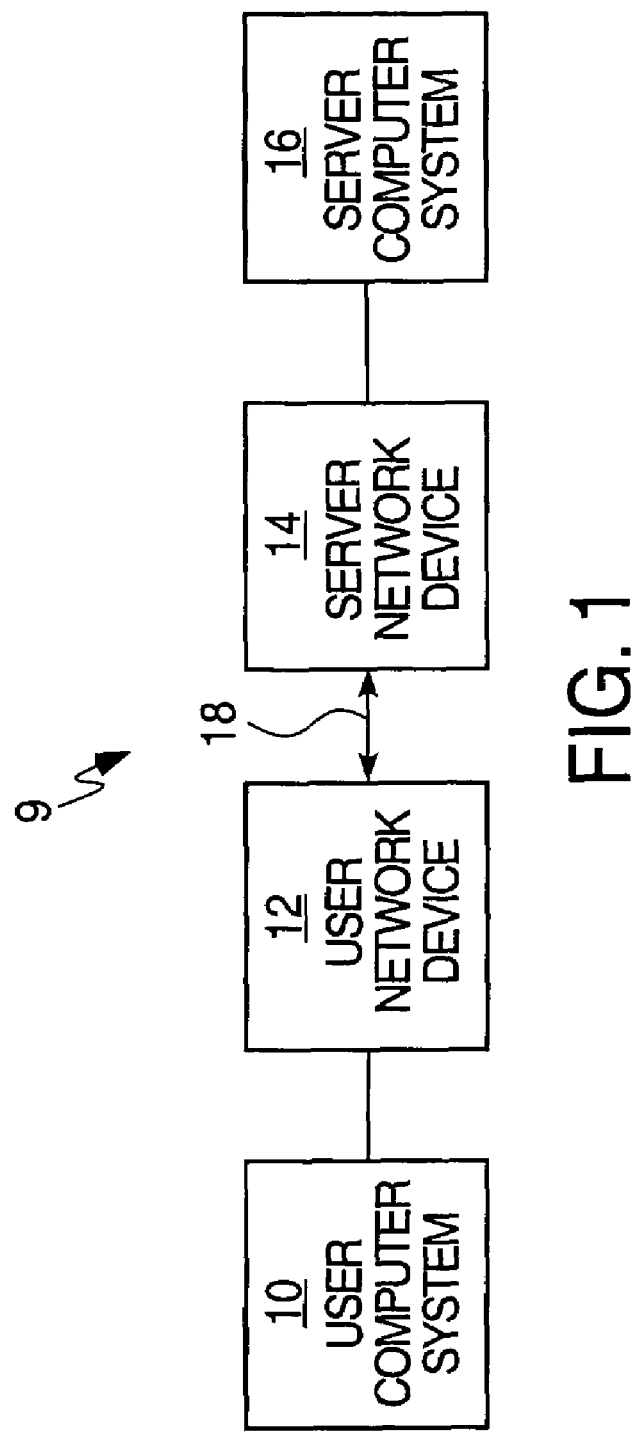
FIG. 1 is a block diagram illustrating a system for executing a rental software program in a distributed computing environment in accordance with the present invention.

Referring to FIG. 1, there is shown a block diagram illustrating an online software rental system 9 for renting and executing a rental software program in a distributed computing environment in accordance with the present invention. The software program to be rented may include a main executable file and optional files, wherein the optional files are optionally requested by from a user computer system 10. Further, the optional files may include a registry file. The "rental software program" means a software application or program rented from a server computer system 16 to a user computer system 10 based on a user-transparent program install-free technology in accordance with the invention. In the preferred embodiment, the user transparent install-free technology is the downloading of the main software application file initially and then the automatic download of the other optional files as described below with reference to FIG. 10. The online software rental service can be implemented using any communications or computer network that connects the server computer system to the client computer system, such as the Internet.

As shown, the system may include a user computer system 10 and a user network device 12 referred to together as a client computer system, a server network device 14 and a server computer system 16, wherein the user computer system 10 is based on a user-transparent program install-free technology. The server computer system 16 and the user computer system may be connected to each other over a communications or computer network 18, such as a wide area network like the Internet. When a communication connection between the user computer system 10 and the server computer system 16 is established, the user computer system 10 can select a desirable rental software program from a list of rental software programs downloaded from the server computer system 16.

The user computer system 10 may download a main executable file for the selected rental software program to create and run a process corresponding to the main executable file. When the process needs one or more optional files, the user computer system 10 requests the one or more optional files contained in the rental software program from the server computer system 16 via the user network device 12. Further, the user computer system 10 may fetch the one or more optional files contained in the rental software program from the server computer system 16. The server computer system 16 provides the one or more program files contained in the rental software program to the user computer system 10 via the server network device 14. The server computer system 16 manages the one or more optional files contained in the rental software program.

Figure 2:
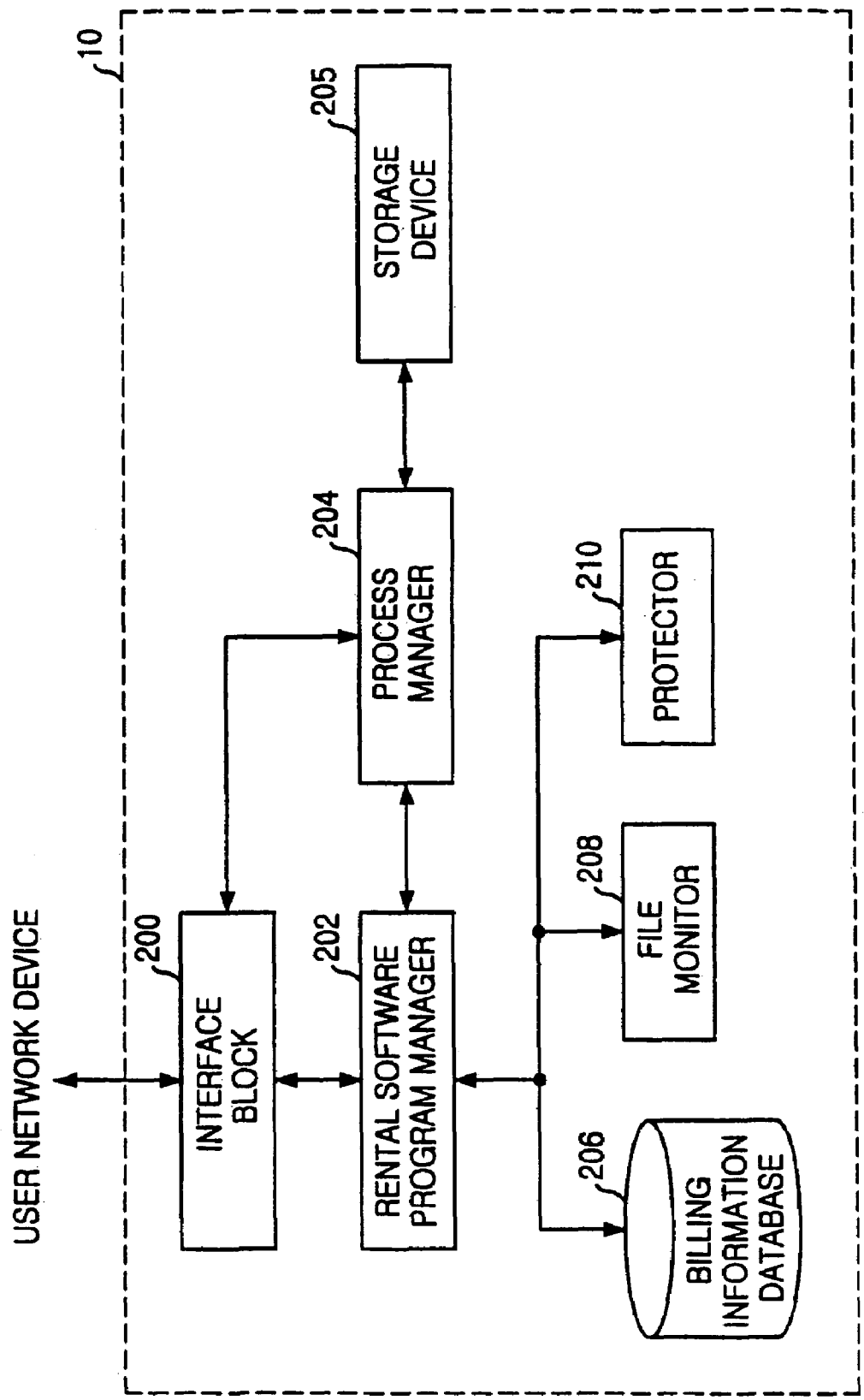
FIG. 2 is a block diagram depicting a user computer system shown in FIG. 1.

Referring to FIG. 2, there is shown a block diagram depicting more details of the user computer system 10 shown in FIG. 1. The user computer system 10 may include an interface block 200, a rental software program manager 202, a process manager 204, a storage device 205, a billing information database 206, a file monitor 208 and a protector 210.

The interface block 200 may interface between the user computer system 10 and the user network device 12 shown in FIG. 1. For example, the interface block 200 may output a message requesting one or more optional files contained in a rental software program to a server computer system 16 via the user network device 12 and a server network device 14 shown in FIG. 1. Further, The interface block 200 receives the one or more optional files from the server computer system 16.

When a communication connection between the user computer system 10 and the server computer system 16 is established, the user computer system 10 receives a list of rental software programs from the server computer system 16 such as a web page listing the software applications displayed in a browser window. The user of the user computer system 10 may then select a desirable rental software program from the list of rental software programs by using a selection device (not shown). Then, the user computer system 10 receives a main executable file and a list of optional files contained in the selected rental software program from the server computer system 16.

The rental software program manager 202 converts registry file information contained in the list of optional files into registry file information appropriate to the user computer system 10.

The process manager 204 creates and runs a process corresponding to the main executable file contained in the selected rental software program. If the process needs the one or more optional files, the process manager 204 suspends the process until the process manager 204 receives the one or more optional files from the server computer system 16.

The storage device 205 stores the main executable file, the one or more optional files and the list of optional files. Further, when the process is complete, the main executable file and the one or more optional files stored in the storage device 205 are flushed by the process manager 204.

The billing information database 206 stores billing information including a billing start time, a billing end time and a name of the rental software program selected by the user computer system 10. Further, the user computer system 10 sends the billing information associated with the billing start time and the billing end time to the server computer system 16.

The file monitor 208 monitors the process to determine whether the process needs the one or more optional files while the process is running. If the process needs the one or more optional files while the process is running, the file monitor 208 generates and attaches a message requesting the one or more optional files from the process. The file monitor 208 then requests the one or more optional files from the server computer system 16.

The protector 210 protects the rental software program including the main executable file and the one or more optional files from an unauthorized use committed by the user computer system 10.

Figure 3:
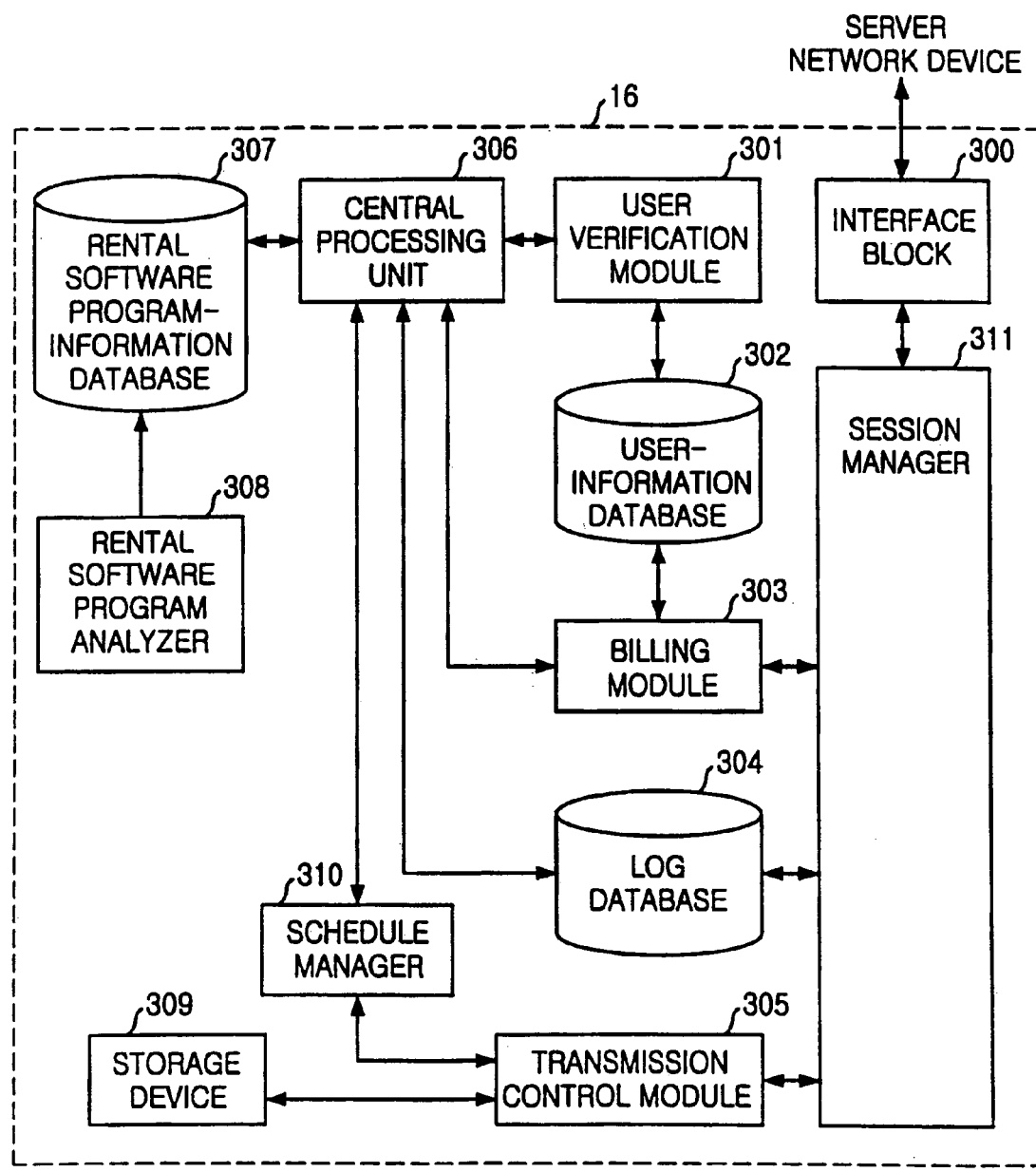
FIG. 3 is a block diagram describing a server computer system shown in FIG. 1.

Referring to FIG. 3, there is shown a block diagram describing a server computer system 16 shown in FIG. 1. As shown, the server computer system 16 includes an interface block 300, a user verification module 301, a user-information database 302, a billing module 303, a log database 304, a transmission control module 305, a central processing unit 306, a rental software program-information database 307, a rental software program analyzer 308, a storage device 309, a schedule manager 310 and a session manager 311.

The interface block 300 may interface between the server computer system 16 and the server network device 14 shown in FIG. 1. For example, the interface block 300 receives a message requesting one or more optional files associated with a rental software program from a user computer system 10 via the server network device 14 as shown in FIG. 1. Further, the interface block 300 outputs the one or more optional files requested from the server computer system 16 to the user computer system 10.

When a communication connection between the user computer system 10 and the server computer system 16 is established, the user verification module 301 verifies the user computer system 10 or a user by using identification information of the user computer system 10 or the information about the user stored in the user-information database 302.

The user-information database 302 stores the identification information of the user computer system 10 and billing information of the user computer system 10.

The billing module 303 processes the charges or fees to be paid for the usage of the main executable file and the one or more optional files contained in the rental software program provided from the server computer system 16 to the user computer system 10.

The log database 304 stores information, e.g., a log file, necessary for recovering the server computer system 16 when the server computer system 16 is not operable due to a serious error (e.g., crashes).

When the user computer system 10 requests the one or more optional files from the server computer system 16, the transmission control module 305 obtains the one or more optional files from the storage device 309. After the transmission control module 305 obtains the one or more optional files, the transmission control module 305 transmits the one or more optional files via the session manager 311 to the user computer system 10.

The central processing unit 306 informs other components whether user verification and billing are successful and controls the other functional elements of the system. In a preferred embodiment, the functional blocks of the server computer system may be implemented in software. Further, when the server computer system 16 is not operable due to the serious error, the central processing unit 306 recovers the server computer system 16 by using the log file stored in the log database 304.

The rental software program-information database 307 stores the path information of main executable files associated with rental software programs, a list of rental software programs as main executable files and a list of optional files associated with a corresponding rental software program.

When a new rental software program is installed in the server computer system 16, the rental software program analyzer 308 analyzes a new rental software program. Then, the rental software program analyzer 308 stores the path information of a main executable file and a list of optional files, associated with the new rental software program, in the rental software program-information database 307.

The storage device 309 stores the main executable files and the one or more optional files associated with the rental software program corresponding to the path information.

The schedule manager 310 manages a schedule of requests from the user computer system and other user computer systems (not shown).

The session manager 311 manages a communication session between the user computer system 10 and the server computer system 16.

Referring to FIG. 4, there is shown a flowchart showing a method for executing a rental software program in a distributed computing environment in accordance with the present invention. The rental software program includes a main executable file and one or more optional files including a registry file.

As shown, at step S400, a communication connection between a user computer system and a server computer system is established. At step S410, it is determined whether the user computer system has passed the user verification and has been authenticated. At this time, a user verification module contained in the server computer system verifies the user computer system or a user by using identification information of the user computer system or the user stored in a user-information database contained in the server computer system.

At step S420, if the user computer system is verified, the user computer system displays a list of rental software programs downloaded from the server computer system, e.g., from a rental software program-information database contained in the server computer system. At step S430, the user of the user computer system selects a desirable rental software program in the list of rental software programs.

At step S440, the user computer system downloads a main executable file and a list of optional files associated with the desirable rental software program from the server computer system. At this time, a process manager contained in the user computer system creates and runs a process corresponding to the main executable file.

At step S460, it is determined whether the process has been completed. At step S470, if the process has been completed, a clean-up procedure accompanying process completion is performed as described below with reference to FIG. 6.

At step S480, it is determined whether the user computer system wants to select another rental software program. At step S490, if the user computer system does not want to select another rental software program, the user computer system terminates the communication with the server computer system. On the other hand, if the user computer system wants to select another rental software program, then steps S430 through S490 are repeated.

Figure 5A:
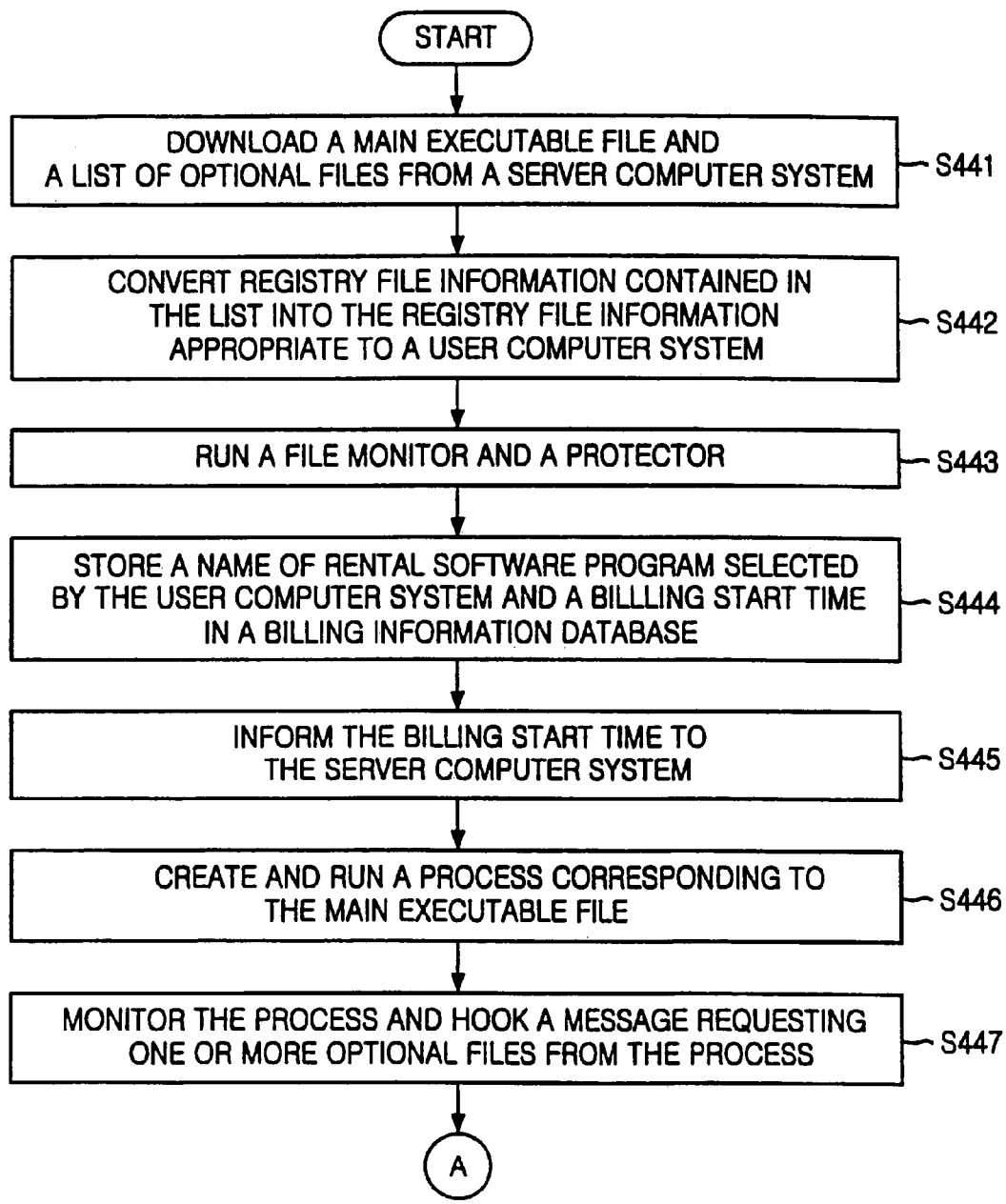
FIGS. 5A and 5B are flowcharts illustrating more details of the method shown in FIG. 4.
Figure 5B:
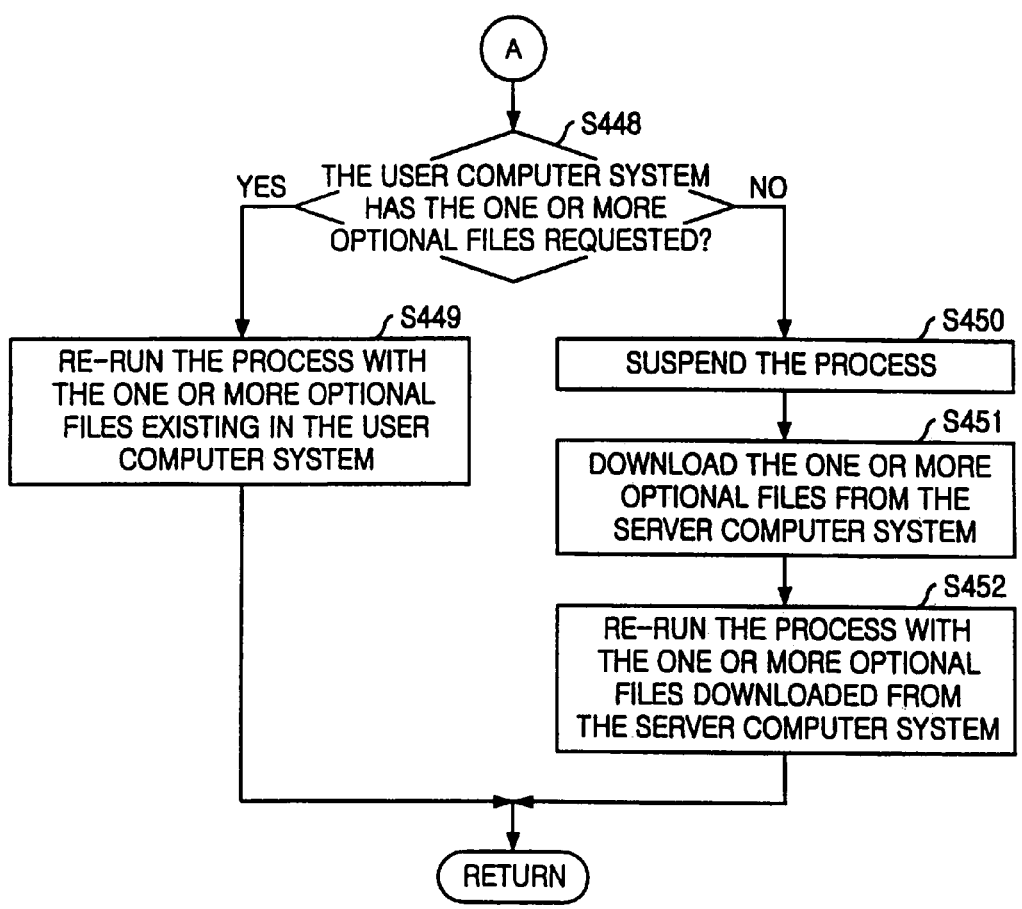

Referring to FIGS. 5A and 5B, there are shown flowcharts illustrating the procedure of running a process shown in FIG. 4. As shown, at step S441, the user computer system downloads a main executable file and a list of optional files from the server computer system. At step S442, a rental software program manager contained in the user computer system converts registry file information contained in the list of optional files into registry file information appropriate to the user computer system.

At step S443, the user computer system runs a file monitor and a protector module, which protects the rental software program including the main executable file and the one or more optional files from an unauthorized use committed by the user computer system.

At step S444, a billing information database contained in the user computer system stores a name of a rental software program selected by the user computer system and a billing start time.

At step S445, the user computer system informs the server computer system of the billing start time. Further, a user-information database contained in the server computer system stores information of the billing start time from the user computer system.

At step S446, a process manager contained in the user computer system creates and runs a process corresponding to the main executable file.

At step S447, the file monitor monitors the process to determine whether the process needs one or more files. Further the file monitor hooks a message requesting one or more optional files from the process to request the one or more optional files to the server computer system by using an on-demand scheme.

At step S448, it is determined whether the user computer system has the one or more optional files requested. At step S449, if the user computer system has the one or more optional files requested, the process manager re-runs the process with the one or more optional files existing in the user computer system.

At step S450, if the user computer system does not have the one or more optional files, the process manager suspends the process. At step S451, the process manger downloads the one or more optional files from the server computer system. At this time, the server computer system sends the one or more optional files stored in a storage device of the server computer system to the user computer system via a session manager. At step S452, the process manager re-runs the process with the one or more optional files downloaded from the server computer system.

Figure 6:
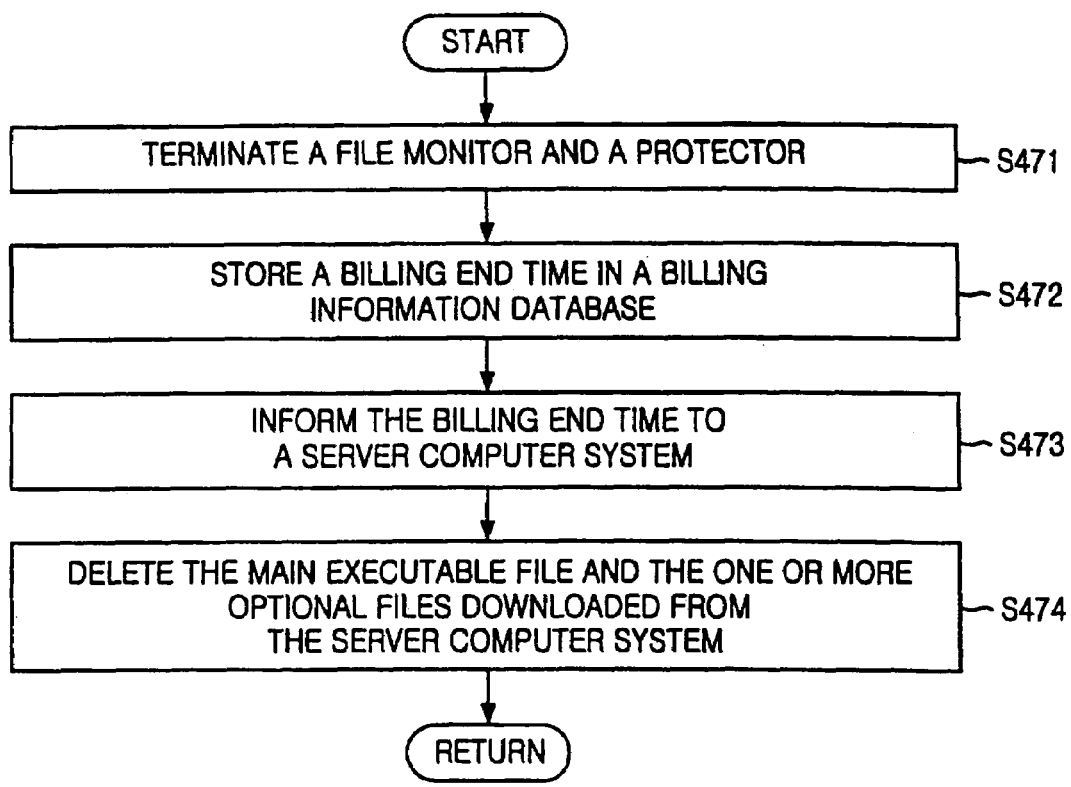
FIG. 6 is a flowchart depicting a method for cleaning up the rental process shown in FIG. 4.

Referring to FIG. 6, there is shown a flowchart depicting the procedure for process completion shown in FIG. 4. At step S471, if the process has been completed, the user computer system terminates the file monitor and the protector processes. At step S472, the user computer system stores a billing end time in the billing information database.

At step S473, the user computer system informs the server computer system of the billing end time. The server computer system stores information of the billing end time in the user-information database. A billing module contained in the server computer system processes charge or fee to be paid for the usage of the main executable file and the one or more optional files contained in the rental software program provided from the server computer system to the user computer system.

At step S474, the user computer system flushes the main executable file and the one or more optional files stored in the storage device of the user computer system.

The method for executing the rental software program in the distributed computing environment in accordance with the present invention can be stored in a computer-readable medium, e.g. an optical disk, a hard disk and so on.

Figure 7:
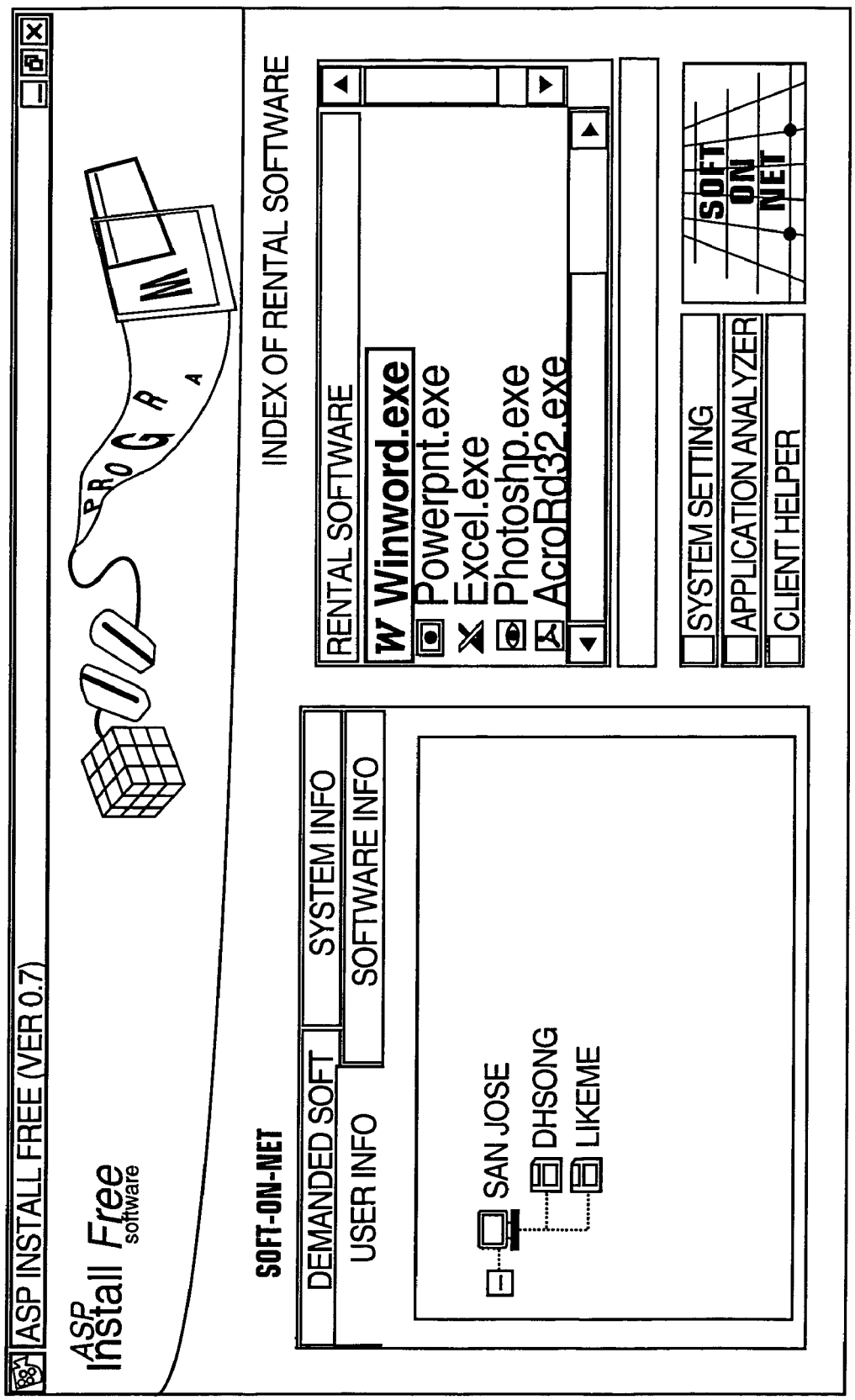
FIG. 7 is an exemplary diagram describing a list of rental software programs displayed in a server computer system shown in FIG. 1.

Referring to FIG. 7, there is shown an exemplary diagram describing a list of rental software programs displayed in a server computer system shown in FIG. 1. For example, the list of rental software programs includes rental software programs of Winword.exe, Powerpnt.exe, Excel.exe, Photoshp.exe and AcroRd32.exe as shown in FIG. 7.

Figure 8:
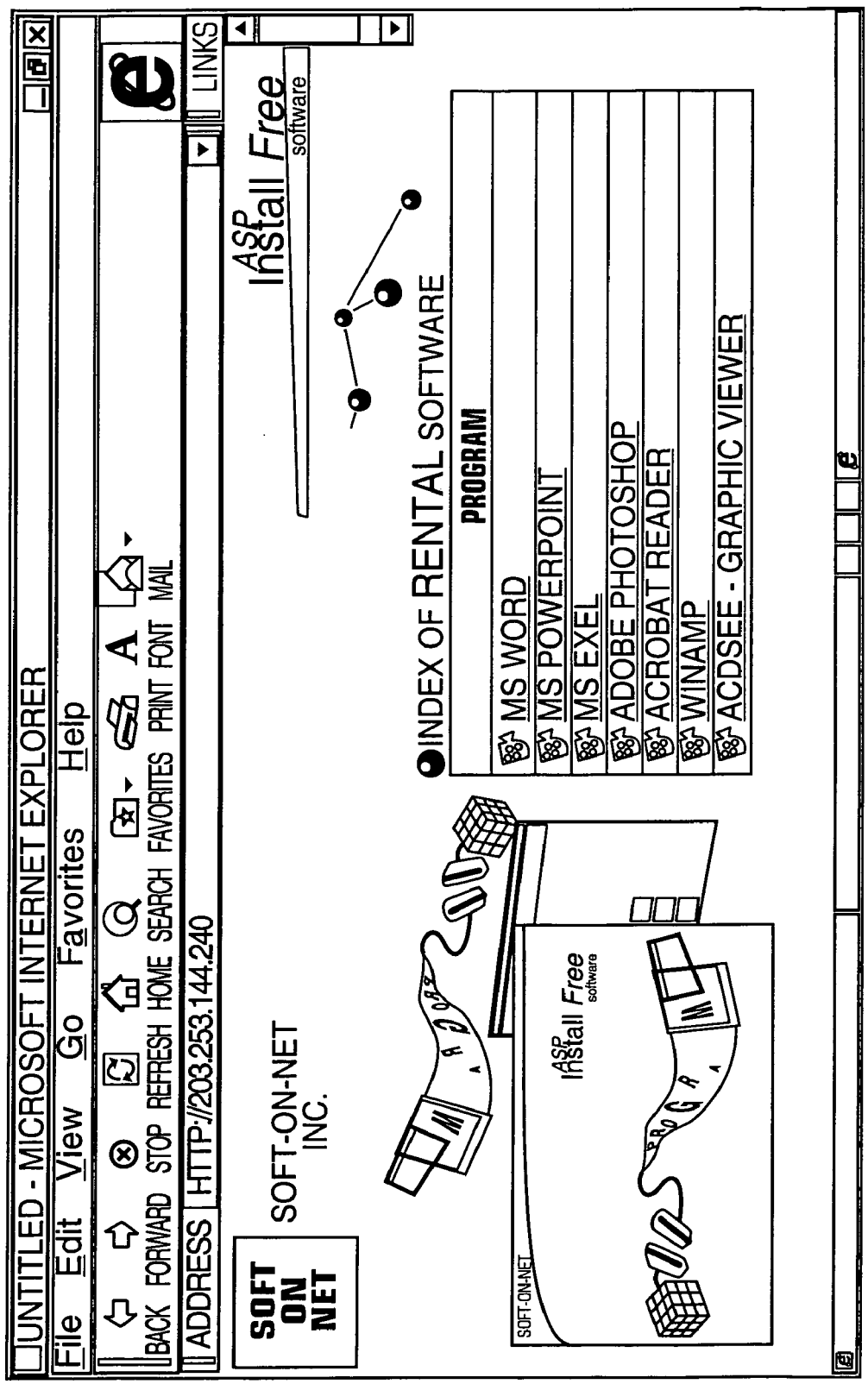
FIG. 8 is an exemplary diagram describing a list of rental software programs displayed in a user computer system shown in FIG. 1.

Referring to FIG. 8, there is shown an exemplary diagram describing a list of rental software programs displayed in a user computer system, such as a web page in a browser window, as shown in FIG. 1. For example, the list of rental software programs includes rental software programs of MS word, MS PowerPoint, MS Excel, Adobe PhotoShop, Winamp and ACDSee-graphic Viewer as shown in FIG. 8.

Figure 9:
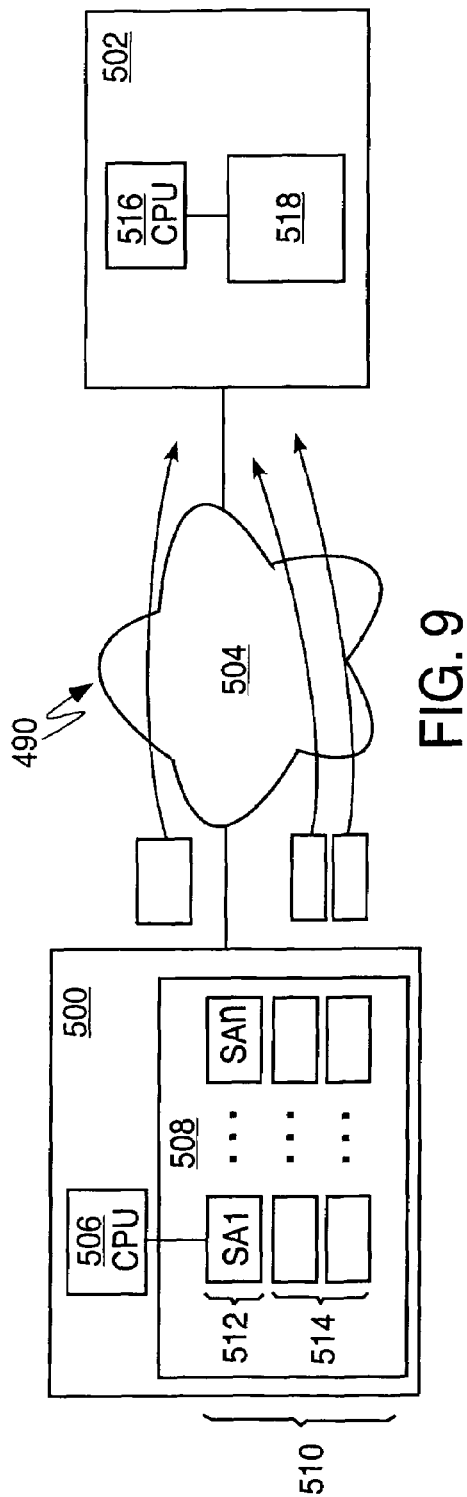
FIG. 9 is a diagram illustrating the streaming of software applications files in accordance with the invention.

FIG. 9 is a diagram illustrating a system 490 for streaming of software applications files in accordance with the invention between a server computer 500 and a client computer 502 over a computer network 504, such as a wide area network (WAN), a local area network (LAN), the World Wide Web (WWW), or the Internet. In particular, the server computer 500 may include a central processing unit (CPU) 506 and a memory 508. Within the memory 508, there may be one or more software applications 510 (SA1 to SAn in this example) that may be rented by a user. Each software application in the server, as described above, may include a main executable file 512 and one or more optional files 514 that may include, for example, DLL files, registry files and the like. The client computer 502 may include a CPU 516 and a memory 518. The software application from the server may be downloaded over the computer network into the memory of the client computer and then flushed from the memory of the client computer once the user is done with the rental of the software application.

In order for the client computer 502 to rent a software application in accordance with the invention, the software application is streamed to the client computer. In more detail, when the user selects a software application to rent, the server downloads the main executable file 512 to the client computer. The client computer, using the process manager 204 described above, may execute the main executable file and start the software application. As described below in more detail, the system may monitor the system calls made by the main executable file and, when a particular optional file, such as a DLL file, is called by the main executable file, the process manager may suspend the operation of the main executable file. The client may then request the needed optional file from the server, have it downloaded from the server and restart the operation of the main executable file once the optional file is resident on the client computer. The suspension and restarting of the execution of the main executable file permits only the main executable file to be initially downloaded to the client computer and then optional files, as needed, to be downloaded. In this manner, a rented software application is streamed down to the client computer in that only the main executable file is initially downloaded and then the optional files are downloaded when they are needed. Now, an example of the operation of an embodiment of the system in accordance with the invention will be described.

Figure 10:
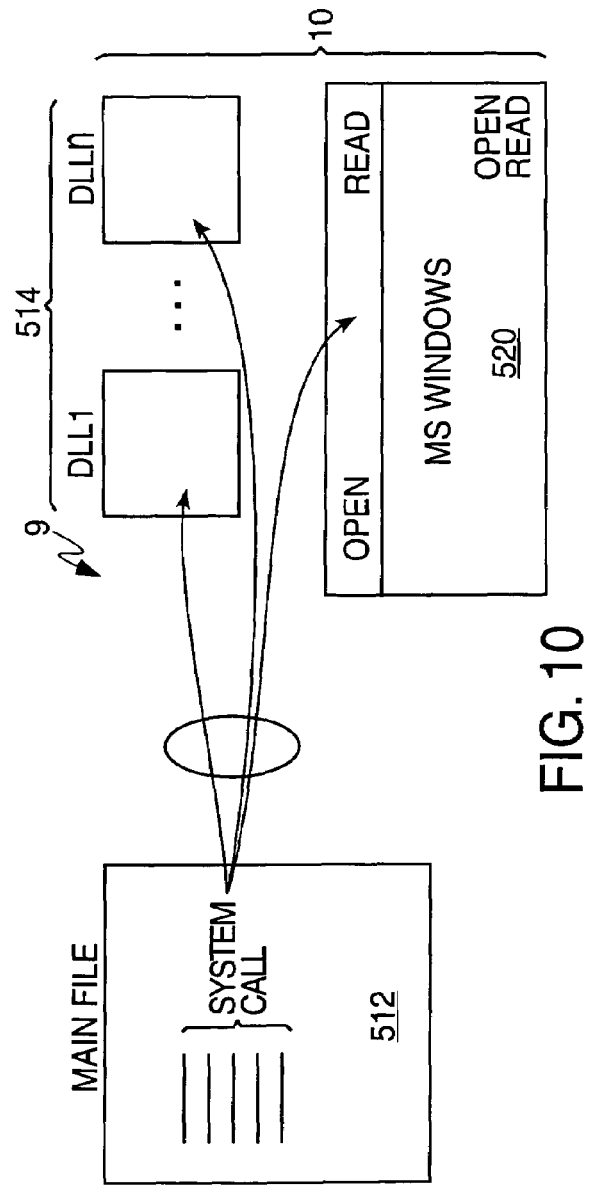
FIG. 10 is a diagram illustrating an example of the operation of an embodiment of the system shown in FIG. 1.

FIG. 10 is a diagram illustrating an example of the operation of the preferred embodiment of the system 9 shown in FIG. 1. In particular, the client computer 10 (and in more detail, its memory containing the main executable file 512) along with the optional files 514 on the server are shown. In accordance with the invention, the main executable file 512 is executed by the process manager shown in FIG. 2. During the execution of the main executable file, it will make systems calls to an operating system 520, such as Microsoft Windows, of the client computer. For example, the main executable file may call processes in the operating system to open or read a required DLL file. In accordance with the invention, the process manager may intercept the system calls and analyze them. If a system call is intercepted to open a DLL file or other optional file that is not currently resident on the client computer, the process manager of the system may suspend the operation of the main executable file and request the download of the necessary optional file from the server. When the optional file has been received by the client computer, the process manager may restart the operation of the main executable file. In a typical computer system. if the main executable file attempts to open a DLL or other file that does not exist, the main executable file crashes. Thus, the software application is streamed to the client computer and, if a file is missing, the software application may be suspended while the missing file is downloaded.

In summary, the software application rental system in accordance with the invention has many advantages over typical software application systems. The system enables the streaming of software applications to the client computer. It also enables the system calls of the software application to be intercepted and analyzed in order to determine when one or more optional files are needed. The system also suspends the operation of the software application during retrieval of the optional files from the server so that the software application does not crash and then restarts the software application once the optional files are retrieved. The system also protects the software application and its optional files from unwanted copying in that the system may remove all of the files from the client computer once the rental of the software application has been completed. Finally, the system also enables a software vendor to easily and quickly upload a new software application to the server so that client computers may rent the software application.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The invention claimed is:

1. A system for renting a software program in a distributed computing environment, wherein the rental software program includes a main executable file and optional files called by the main executable file that are executed by the main executable file to implement the rental software program without the rental software program being installed on the user computer system, comprising:

a user computer system including means for initially downloading the main executable file of the rental software program to begin execution of the rental software program and means, if an optional file is missing, for automatically requesting one or more optional files contained in the rental software program in order to continue execution of the rental software program using the optional files;

a server computer system for downloading the main executable file contained in the rental software program to be executed in said user computer system and means for automatically downloading the one or more optional files as requested by said user computer system;

wherein the user computer system further comprises a process manager means further comprising means for creating and running a process corresponding to the main executable file without installing the rental software program on the user computer system, means for suspending the process if the process requests one or more optional files, and means for re-starting the process if said process manager means receives the one or more optional files from said server computer system; and wherein the process manager flushes the main executable file and the optional files of the rental software program from the user computer system so that the rental software program is removed from the user computer system when the rental is completed.

2. The system as recited in claim 1, wherein the user computer system further comprising:

a storage means for storing the main executable file, the one or more optional files contained in the rental software program if downloaded and a list of optional files downloaded from said server computer system; and a monitor means for monitoring the process to determine whether the process requests the one or more optional files, and further comprising means for intercepting a message requesting the one or more optional files from the process, and means for automatically requesting the one or more optional files to said server computer system.

3. The system as recited in claim 2, wherein said server computer system further comprising means for sending the list of optional files to said user computer system when said server computer sends the main executable file to said user computer system and wherein the optional files includes a registry file.

4. The system as recited in claim 3, wherein said user computer system further includes:

a protection means for protecting the rental software program rented from said server computer system to prevent an unauthorized use committed by said user computer system;

a converting means for converting registry file information contained in the list of optional files into registry file information appropriate to said user computer system; and a billing database for storing billing information.

5. The system as recited in claim 4, wherein the billing information includes a billing start time, a billing end time and a name of the rental software program selected by said user computer system.

6. The system as recited in claim 1, wherein said server computer system includes:
- a verification means for verifying said user computer system by using identification information of said user computer system stored in a user-information database;
- a program database for storing path information of the main executable file, a list of rental software programs and a list of the optional files;
- an analyzing means for analyzing a new rental software program when the new rental software program is installed in said server computer system, wherein said analyzing means further comprises means for storing the path information of the main executable file and a list of the optional files, associated with the new rental software program, in said program database;
- a storage means for storing the main executable file and the one or more optional files; and
- a means for obtaining and sending the main executable file stored in said storage means when said user computer system selects the desirable rental software program; and
- means for obtaining and sending the one or more optional files stored in said storage means when said user computer system optionally requests the one or more optional files to said server computer system.

7. The system as recited in claim 6, wherein said server computer system further includes:
- a billing means for processing charge or fee to be paid for the usage of the main executable file and the one or more optional files associated with the rental software program provided to said user computer system;
- a log database for storing a log file necessary for recovering said server computer system when said server computer system is not operable due to a serious error;
- a recovery means for recovering said server computer system by using the log file stored in said log database when said server computer system is not operable due to the serious error;
- a schedule management means for managing a schedule of requests from said user computer system and another user computer system; and
- a session management means for managing a communication session between said user computer system and said server computer system.

8. The system as recited in claim 7, wherein said server computer system sends the list of optional files to said user computer system when said server computer system sends the main executable file to said user computer system and wherein the optional files includes a registry file.

9. A method for renting a rental software program in a distributed computing environment, wherein the rental software program includes a main executable file and optional files called by the main executable file that are executed by the main executable file to implement the rental software program without the rental software program being installed on the user computer system, comprising:
- performing a communication connection between a user computer system and a server computer system, wherein the user computer system is based on a user-transparent program install-free technology;
- displaying a list of rental software programs downloaded from the server computer system;
- selecting the rental software program in the list of rental software programs;
- downloading a main executable file associated with the rental software program from the server computer system to run a process corresponding to the main executable file without installing the rental software program on the user computer system and begin execution of the rental software program; and
- if the process needs one or more optional files, downloading the one or more optional files from the server computer system in order to continue execution of the rental software program using the optional files, further comprising monitoring the process in the file monitor in order to determine whether the process needs the one or more optional files;
- if the process needs the one or more optional files, hooking a message requesting the one or more optional files from process;
- suspending the process until the user computer system downloads the one or more optional files from the server computer system;
- if the user computer system downloads the one or more optional files from the server computer system, re-running the process; and
- wherein the process manager flushes the main executable file and the optional files of the rental software program from the user computer system so that the rental software program is removed from the user computer system when the rental is completed.

10. The method as recited in claim 9, wherein establishing the communications further comprises:
- performing the communication connection between the user computer system and the server computer system; and
- verifying the user computer system in the server computer system.

11. The method as recited in claim 9, wherein downloading the file further comprises:
- downloading the main executable file and a list of optional files from the server computer system, wherein the optional files include a registry file;
- converting registry file information contained in the list of optional files into registry file information appropriate to the user computer system;
- running a file monitor and a protector, which protects the rental software program including the main executable file and the one or more optional files from an unauthorized use committed by the user computer system;
- storing a name of the rental software program selected by the user computer system and a billing start time in a billing information database of the user computer system;
- informing the server computer system of the billing start time; and
- creating and running the process corresponding to the main executable file.

12. The method as recited in claim 10, wherein the process completion step further comprises:
- determining whether the process has been complete;
- if the process has been complete, performing a procedure accompanying a process completion;
- determining whether the user computer system wants to select another rental software program;
- if the user computer system wants to select the another rental software program, repeating the steps to download the optional files; and
- if the user computer system does not want to select the another rental software program, terminates the communication connection between the user computer system and the server computer system.

13. The method as recited in claim 12, wherein the process completion step further comprises:

if the process has been complete, terminating the file monitor and the protector;

storing a billing end time in the billing information database of the user computer system;

informing the server computer system of the billing end time; and flushing the main executable file and the one or more optional files stored in the storage device of the user computer system.

14. A method for servicing an install-free application in an online software rental system without the rental software program being installed on the client computer system, comprising:

getting a list of applications available for a rental service from a server computer system;

establishing a rental session between a client computer system and the server computer system;

fetching one or more application software from a plurality of application software stored in the server computer system;

executing the one or more application software in the client computer system using a main executable file and one or more optional files, wherein the one or more application software include a main executable file and wherein executing the application software further comprises:

creating a process corresponding to the main executable file;

running the process without installing the main executable file on the client computer;

monitoring additional requests to access related files from the process by message hooking and file monitoring while the process is running;

if the process needs any related file, generating a message requesting one or more related files and transmitting the message to the server computer system to fetch the one or more related files based on an on-demand scheme;

re-running the process after the one or more related files are delivered to the client computer system in order to incrementally execute the rental software program using the optional files; and if said prior step is complete, flushing the one or more application software rented from the server computer system so that the rental software program is removed from the client computer system when the rental is completed.

15. The method as recited in claim 14, wherein the list of applications is established on Internet.

16. The method as recited in claim 14, wherein the one or more application software is authorized by the server computer system.

17. A computer-readable media storing program instructions, the program instructions disposed on a computer to perform a method for renting a rental software program in a distributed computing environment without the rental software program being installed on the user computer system, wherein the rental software program includes a main executable file and optional files called by the main executable file that are executed by the main executable file to implement the rental software program, comprising the steps of:

establishing a communication connection between a user computer system and a server computer system, wherein the user computer system is based on a user-transparent program install-free technology;

displaying a list of rental software programs downloaded from the server computer system;

selecting the rental software program in the list of rental software programs;

downloading a main executable file associated with the rental software program from the server computer system to run a process corresponding to the main executable file to begin executing the rental software program without installing the rental software program on the user computer system;

if the process needs one or more optional files, downloading the one or more optional files from the server computer system in order to continue execution of the rental software program using the optional files;

wherein downloading optional files further comprises monitoring the process in the file monitor in order to determine whether the process needs the one or more optional files; if the process needs the one or more optional files, hooking a message requesting the one or more optional files from process; suspending the process until the user computer system downloads the one or more optional files from the server computer system; and if the user computer system downloads the one or more optional files from the server computer system, re-running the process; and flushing the main executable file and the optional files of the rental software program from the user computer system so that the rental software program is removed from the user computer system when the rental is completed.

18. The computer-readable media as recited in claim 17, wherein establishing the communications further comprises:

performing the communication connection between the user computer system and the server computer system; and verifying the user computer system in the server computer system.

19. The computer-readable media as recited in claim 17, wherein downloading further comprises:

downloading the main executable file and a list of optional files from the server computer system, wherein the optional files include a registry file;

converting registry file information contained in the list of optional files into registry file information appropriate to the user computer system;

running a file monitor and a protector, which protects the rental software program including the main executable file and the one or more optional files from an unauthorized use committed by the user computer system;

storing a name of the rental software program selected by the user computer system and a billing start time in a billing information database of the user computer system;

informing the server computer system of the billing start time; and creating and running the process corresponding to the main executable file.

20. The computer-readable media as recited in claim 18, wherein downloading the optional files further comprises:

determining whether the process has been complete;

if the process has been complete, performing a procedure accompanying a process completion;

determining whether the user computer system wants to select another rental software program;

if the user computer system wants to select the another rental software program, repeating the application software downloading steps; and if the user computer system does not want to select the another rental software program, terminates the communication connection between the user computer system and the server computer system.

21. The computer-readable media as recited in claim 20, wherein the completion process further comprises:
- if the process has been complete, terminating the file monitor and the protector;
- storing a billing end time in the billing information database of the user computer system;
- informing the server computer system of the billing end time; and
- flushing the main executable file and the one or more optional files stored in the storage device of the user computer system.

22. A system for renting a rental software program in a distributed computing environment, wherein the rental software program includes a main executable file and one or more optional files called by the main executable file that are executed by the main executable file to implement the rental software program without the rental software program being installed on the system, comprising:
- a first means for pulling the main executable file out of a server computer system to begin execution of the rental software program;
- a second means for pulling the one or more optional files out of the server computer system in order to continue execution of the rental software program using the optional files;
- a storage means for storing the main executable file and the one or more optional files pulled out of the server computer system;
- a process manager means for creating and running a process corresponding to the main executable file wherein the main executable file is not installed on the system; suspending the process if the process requests the one or more optional files; and re-running the process if said process manager means receives the one or more optional files;
- a monitor means for monitoring the process to determine whether the process requests the one or more optional files; and hooking a message requesting the one or more optional files from the process; and
- means for flushing the main executable file and the optional files of the rental software program from the storage means so that the rental software program is removed from the system when the rental is completed.

23. The system as recited in claim 22, further comprising:
- a protection means for protecting the rental software program to prevent an unauthorized use committed by said user computer system; and
- a billing database for storing billing information.

24. The system as recited in claim 23, wherein the billing information includes a billing start time, a billing end time and a name of the rental software program.

25. A system for providing a rental software program in a distributed computing environment, wherein the rental software program includes a main executable file and one or more optional files called by the main executable file that are executed by the main executable file to implement the rental software program without the rental software program being installed on the user computer system, comprising:
- a first means for pushing the main executable file into a user computer system to begin execution of the rental software program;
- a second means for pushing the one or more optional files into the user computer system in order to continue execution of the rental software program using the optional files;
- a storage means for storing the main executable file and the one or more optional files pulled out of the server computer system;
- a process manager means for creating and running a process corresponding to the main executable file without installing the rental software program on the user computer system; suspending the process if the process requests the one or more optional files; and re-running the process if said process manager means receives the one or more optional files;
- a monitor means for monitoring the process to determine whether the process requests the one or more optional files; and hooking a message requesting the one or more optional files from the process; and
- means for flushing the main executable file and the optional files of the rental software program from the storage means so that the rental software program is removed from the user computer system when the rental is completed.

26. The system as recited in claim 24, wherein said first and second means are intended for advertisement.

27. The system as recited in claim 24, wherein said first and second means are intended for freeware.

28. The system as recited in claim 25, further comprising:
- a program database for storing path information of the main executable file, a list of rental software programs and a list of the optional files;
- an analyzing means for analyzing a new rental software program when the new rental software program is installed, wherein said analyzing means stores the path information of the main executable file and a list of the optional files, associated with the new rental software program, in said program database; and
- a storage means for storing the main executable file and the one or more optional files.

29. A system for renting a rental software program, wherein the system includes at least one client computer system and a server computer system and the rental software program includes a main executable file and one or more optional files called by the main executable file that are executed by the main executable file to implement the rental software program without the rental software program being installed on the user computer system, comprising:
- a first means for pulling the main executable file into a user computer system to begin execution of the rental software program;
- a second means for pulling the one or more optional files into the user computer system in order to continue execution of the rental software program using the optional files;
- a storage means for storing the main executable file and the one or more optional files pulled out of the server computer system;
- a process manager means for creating and running a process corresponding to the main executable file without installing the rental software program on the user computer system; suspending the process if the process requests the one or more optional files; and re-running the process if said process manager means receives the one or more optional files;
- a monitor means for monitoring the process to determine whether the process requests the one or more optional files; and hooking a message requesting the one or more optional files from the process; and
- means for flushing the main executable file and the optional files of the rental software program from the storage means so that the rental software program is removed from the user computer system when the rental is completed.

30. The system as recited in claim 29, further comprising:
a protection means for protecting the rental software program to prevent an unauthorized use; and
a billing database for storing billing information.

31. The system as recited in claim 30, wherein the billing information includes a billing start time, a billing end time and a name of the rental software program.

32. The system as recited in claim 29, further comprising:
a program database for storing path information of the main executable file, a list of rental software programs and a list of the optional files;
an analyzing means for analyzing a new rental software program when the new rental software program is installed, wherein said analyzing means stores the path information of the main executable file and a list of the optional files, associated with the new rental software program, in said program database; and
a storage means for storing the main executable file and the one or more optional files.

33. A server for renting a rental software program to a client computer without the rental software program being installed on the client computer, the server comprising:
means for storing a software program that is rentable by a user, the software program including a main executable file and one or more optional files called by the main executable file that are executed by the main executable file to implement the rental software program;
means for downloading the main executable file in response to a user's request to rent the software program and begin executing the rental software program;
means for automatically streaming the one or more optional files associated with the main executable file down to the client computer when requested by the client computer in order to continue executing of the rental software program using the optional files, wherein the server implements an install fee, user transparent rental technique since the optional files are automatically downloaded to the client computer as needed; and
the client computer further comprising a storage means for storing the main executable file and the one or more optional files pulled out of the server computer system;
a process manager means for creating and running a process corresponding to the main executable file without installing the rental software program on the client computer; suspending the process if the process requests the one or more optional files; and re-running the process if said process manager means receives the one or more optional files;
a monitor means for monitoring the process to determine whether the process requests the one or more optional files; and hooking a message requesting the one or more optional files from the process; and
means for flushing the main executable file and the optional files of the rental software program from the storage means so that the rental software program is removed from the client computer when the rental is completed.

34. The server as recited in claim 33 further comprising means for downloading a list of optional files to said user computer system when said server computer sends the main executable file to said client computer system and wherein the optional files includes a registry file.

35. The server as recited in claim 33 further comprising:
a verification means for verifying said user computer system by using identification information of said user computer system stored in a user-information database;
a program database for storing path information of the main executable file, a list of rental software programs and a list of the optional files;
an analyzing means for analyzing a new rental software program when the new rental software program is installed in said server computer system, wherein said analyzing means stores the path information of the main executable file and a list of the optional files, associated with the new rental software program, in said program database;
a storage means for storing the main executable file and the one or more optional files; and
a means for obtaining and sending the main executable file stored in said storage means when said user computer system selects the desirable rental software program; and obtaining and sending the one or more optional files stored in said storage means when said user computer system optionally requests the one or more optional files to said server computer system.

36. The server as recited in claim 35 further comprising:
a billing means for processing charge or fee to be paid for the usage of the main executable file and the one or more optional files associated with the rental software program provided to said user computer system;
a log database for storing a log file necessary for recovering said server computer system when said server computer system is not operable due to a serious error;
a recovery means for recovering said server computer system by using the log file stored in said log database when said server computer system is not operable due to the serious error;
a schedule management means for managing a schedule of requests from said user computer system and another user computer system; and
a session management means for managing a communication session between said user computer system and said server computer system.

37. The server as recited in claim 36 further comprising means for sending a list of optional files to said user computer system when said server computer system sends the main executable file to said user computer system and wherein the optional files includes a registry file.

38. A client for renting a software program in a distributed computing environment, wherein the rental software program includes a main executable file and optional files without the rental software program being installed on the client, comprising:
means for requesting a rental software program from the server;
means for receiving the main executable file of the software program from the server to begin executing of the rental software program;
means for determining that an optional file is required by the main executable file, the optional file being called by the main executable file that are executed by the main executable file to implement the rental software program in order to continue execution of the rental software program using the optional files;
means for requesting the optional file from the server;
means for receiving the optional file;
a storage means for storing the main executable file, the one or more optional files contained in the rental software program if downloaded and a list of optional files downloaded from said server computer system;

a process manager means further comprising means for creating and running a process corresponding to the main executable file without installing the rental software program on the client, means for suspending the process if the process requests one or more optional files, and means for re-starting the process if said process manager means receives the one or more optional files from said server computer system;

a monitor means for monitoring the process to determine whether the process requests the one or more optional files, and further comprising means for intercepting a message requesting the one or more optional files from the process, and means for automatically requesting the one or more optional files to said server computer system; and means for flushing the main executable file and the optional files of the rental software program from the storage means so that the rental software program is removed from the client when the rental is completed.

39. The client as recited in claim 38 further comprising:

a protection means for protecting the rental software program rented from said server computer system to prevent an unauthorized use committed by said user computer system;

a converting means for converting registry file information contained in the list of optional files into registry file information appropriate to said user computer system; and a billing database for storing billing information.

40. The client as recited in claim 39, wherein the billing information includes a billing start time, a billing end time and a name of the rental software program selected by said user computer system.

41. The client as recited in claim 40, wherein said process manager means comprises means for flushing the main executable file and the one or more optional files stored in said storage means when the process is complete.

* * * * *